(12) United States Patent
Sakohira et al.

(10) Patent No.: US 10,072,649 B2
(45) Date of Patent: Sep. 11, 2018

(54) ELECTRIC PUMP

(71) Applicants: ASMO CO., LTD., Shizuoka-ken (JP); TOYOTA BOSHOKU KABUSHIKI KAISHA, Aichi-ken (JP)

(72) Inventors: Kazutaka Sakohira, Kosai (JP); Kazuhiro Mori, Toyohashi (JP); Masaru Kubota, Toyohashi (JP); Yosuke Uno, Nagakute (JP); Yuya Inoue, Toyota (JP); Masashi Yanagawa, Kasugai (JP)

(73) Assignees: Denso Corporation, Kariya (JP); Toyota Boshoku Kabushiki Kaisha, Aichi-ken (JP)

( * ) Notice: Subject to any disclaimer, the term of this patent is extended or adjusted under 35 U.S.C. 154(b) by 292 days.

(21) Appl. No.: 15/160,115

(22) Filed: May 20, 2016

(65) Prior Publication Data

US 2016/0348670 A1 Dec. 1, 2016

(30) Foreign Application Priority Data

May 26, 2015 (JP) .................... 2015-106530
Apr. 4, 2016 (JP) .................... 2016-075309

(51) Int. Cl.
*F04B 43/02* (2006.01)
*F04B 49/22* (2006.01)
(Continued)

(52) U.S. Cl.
CPC .......... *F04B 43/026* (2013.01); *B60N 2/4415* (2013.01); *F04B 35/04* (2013.01);
(Continued)

(58) Field of Classification Search
CPC .... F04B 49/22; F04B 45/047; F04B 43/1207; F04B 43/026; F04B 43/0045; F04B 35/01; F04B 45/025; F04B 2201/0601
(Continued)

(56) References Cited

U.S. PATENT DOCUMENTS

| 2,590,007 | A | * | 3/1952 | Griswold | ................ F04B 1/053 |
| | | | | | 137/99 |
| 4,606,235 | A | * | 8/1986 | Kindt | ..................... F16H 27/06 |
| | | | | | 74/112 |
| 5,882,075 | A | * | 3/1999 | Partington | ........... B60N 2/0228 |
| | | | | | 297/344.13 |

FOREIGN PATENT DOCUMENTS

JP  2013-133716 A  7/2013

* cited by examiner

*Primary Examiner* — Patrick Hamo
*Assistant Examiner* — Timothy Solak
(74) *Attorney, Agent, or Firm* — Patterson Thuente Pederson, P.A.

(57) ABSTRACT

An electric pump includes a transmission unit that transmits rotational drive of a motor unit, a pump unit, and a rotary valve unit. The pump unit expands and contracts a pump chamber to draw in a fluid from an inlet and discharge the fluid from an outlet. The rotary valve unit includes a valve body and a valve cover. The valve body is rotated by the rotational drive force transmitted by the transmission unit. The valve cover includes a valve-side inlet that draws in a fluid and a plurality of fluid outlets that discharges the fluid to the exterior. The rotary valve unit is configured to switch the fluid outlets that come into communication with the inlet in accordance with rotational drive of the valve body. The valve body is intermittently driven by an intermittent drive mechanism that converts continuous drive corresponding to the rotational drive force into intermittent drive.

7 Claims, 9 Drawing Sheets

(51) Int. Cl.
  *F04B 45/047* (2006.01)
  *F04B 43/04* (2006.01)
  *F04B 43/00* (2006.01)
  *F04B 35/04* (2006.01)
  *B60N 2/44* (2006.01)
  *F16H 27/06* (2006.01)
  *F16H 1/28* (2006.01)
  *F04B 43/12* (2006.01)

(52) U.S. Cl.
  CPC .......... *F04B 43/0045* (2013.01); *F04B 43/04* (2013.01); *F04B 45/047* (2013.01); *F04B 49/22* (2013.01); *F04B 43/1207* (2013.01); *F16H 1/28* (2013.01); *F16H 27/06* (2013.01)

(58) Field of Classification Search
  USPC ........................................ 296/65.02; 74/113
  See application file for complete search history.

ELECTRIC PUMP

BACKGROUND OF THE INVENTION

The present invention relates to an electric pump.

Japanese Laid-Open Patent Publication No. 2013-133716 describes an example of a conventional electric pump. The electric pump includes a drive shaft, which is rotated when the motor is driven, and actuation portions, which are arranged in the circumferential direction of the drive shaft and sequentially reciprocated by the rotation of the drive shaft. Each actuation portion is coupled to a diaphragm defining a pump chamber. The pump chambers are sequentially expanded and contracted to drawn in fluid from an inlet and discharge the fluid from an outlet.

An electric pump such as that described above is connected to, for example, a bladder accommodated in a vehicle seat. The bladder is inflated and deflated to stimulate the vehicle occupant.

In an electric pump such as that described above, for example, a rotary valve unit that utilizes rotation of a motor may be used to sequentially inflate and deflate a plurality of bladders accommodated in the vehicle seat. A typical rotary valve unit includes a valve body, which rotates when driven by rotational drive force of the motor, and a valve cover, which includes an inlet that draws in a fluid and a plurality of fluid outlets that discharges the fluid to the bladders. The rotary valve unit is configured to switch the fluid outlets that come into communication with the inlet of the cover in accordance with the rotational drive of the valve body. The valve body includes a body-side outlet that is opposed to the fluid outlets, which discharge the fluid to the bladders, and rotated relative to the fluid outlets. When one of the fluid outlets is opposed to (overlapped with) the body-side outlet, the fluid is discharged from the outlet. In this case, to inflate the bladders, the fluid outlet, which discharges the fluid to the bladders, needs to be opposed to the body-side outlet over a sufficient time. In this regard, for example, the body-side outlet may be arc-shaped and larger than each fluid outlet to so that the fluid outlet is opposed to the body-side inlet over a sufficient time. However, there is a limit to the size of the body-side outlet relative to the valve body. This results in the need to enlarge the valve body so that the body-side outlet can have a sufficient size or add a speed reduction unit so that the speed of the valve body can be reduced. However, this may result in enlargement of the pump.

SUMMARY OF THE INVENTION

It is an object of the present invention to provide an electric pump that limits increases in size.

To achieve the above object, one aspect of the present invention is an electric pump that includes a motor unit that is rotated and driven, a transmission unit that transmits rotational drive of the motor unit, a pump unit, and a rotary valve unit. The pump unit uses rotational drive force transmitted by the transmission unit to expand and contract a pump chamber and draw in a fluid from an inlet and discharge the fluid from an outlet. The rotary valve unit includes a valve body and a valve cover. The valve body is rotated by the rotational drive force transmitted by the transmission unit. The valve cover includes a valve-side inlet that draws in a fluid supplied from the pump unit and a plurality of fluid outlets that discharges the fluid to the exterior. The rotary valve unit is configured to switch the fluid outlets that come into communication with the inlet in accordance with rotational drive of the valve body. The valve body is intermittently driven by an intermittent drive mechanism that converts continuous drive corresponding to the rotational drive force into intermittent drive.

DETAILED DESCRIPTION OF THE PREFERRED EMBODIMENTS

One embodiment of a vehicle seat including an electric pump will now be described.

Figure 1:
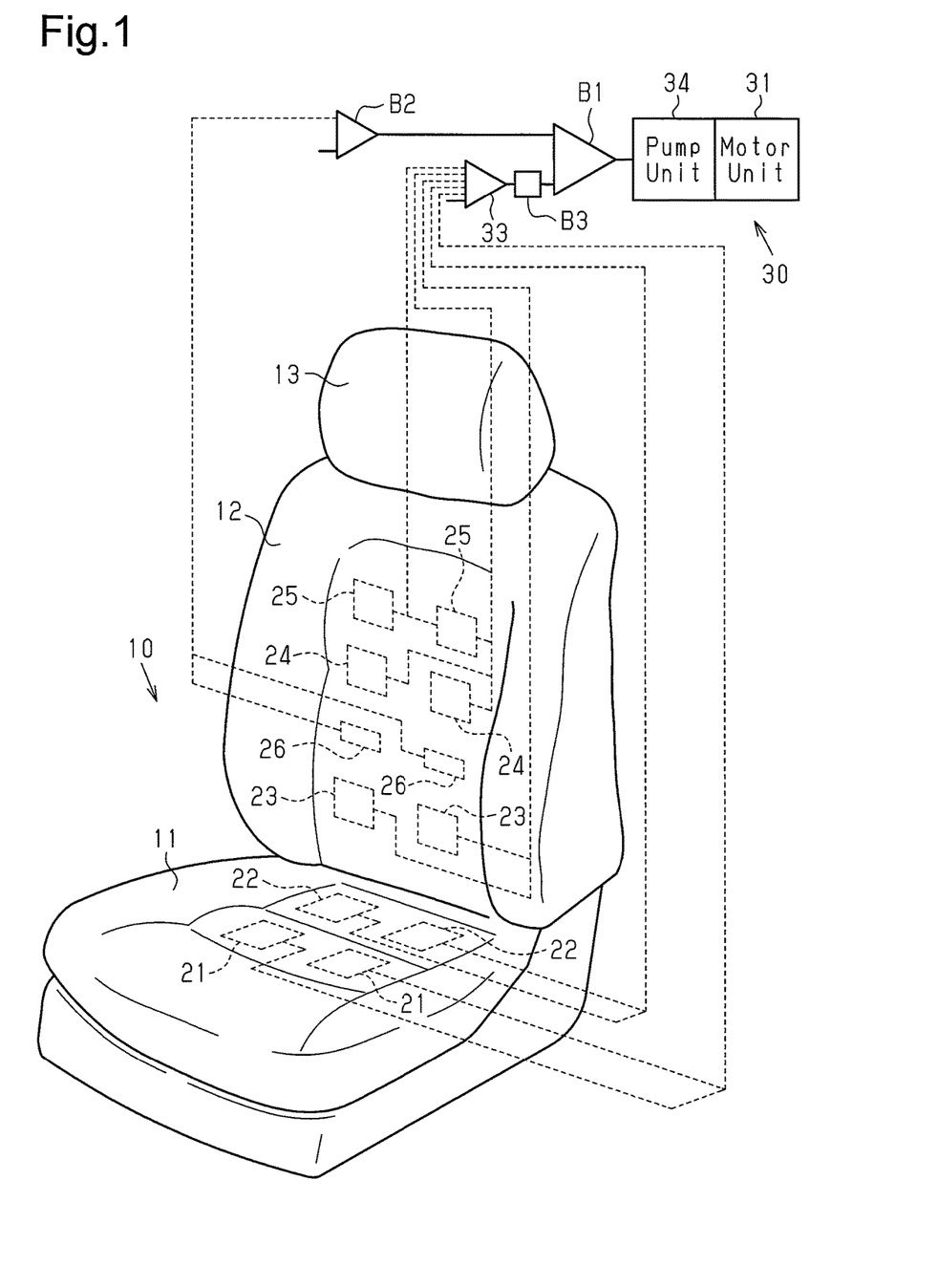
FIG. 1 is a schematic diagram showing the structure of one embodiment of a vehicle seat and an electric pump according to the present invention.

As shown in FIG. 1, the present embodiment of a vehicle seat 10 includes a seat cushion 11, a seatback 12, and a headrest 13. Additionally, an electric pump 30 is located in or proximate to the vehicle seat 10.

The seat cushion 11 includes a seat surface on which the user may be seated. The seatback 12 is supported in an inclinable manner at a rear side of the seat cushion 11.

The seatback 12 defines a backrest against which the user may lean his or her back. The headrest 13, which guards the head of the user, is supported at an upper side of the seatback 12.

In the present embodiment, the seat cushion 11 and the seatback 12 of the vehicle seat 10 accommodate bladders 21 to 26 that can be inflated and deflated.

Bladder

The bladders 21 to 26 include refreshing bladders 21 to 25, which perform a refreshment operation on the seated vehicle occupant, and lumbar bladders 26, which support the lumbar of the seated vehicle occupant.

As shown in FIG. 1, the refreshing bladders 21 to 25 include first bladders 21 and second bladders 22, which are accommodated in the seat cushion 11, and third bladders 23, fourth bladders 24, and fifth bladders 25, which are accommodated in the seatback 12.

Two first bladders 21 are arranged beside each other in the width-wise direction of the seat cushion 11.

Two second bladders 22 are arranged beside each other in the width-wise direction of the seat cushion 11 at positions located toward the rear end (toward the seatback 12) from the first bladders 21.

Two third bladders 23 are arranged beside each other in the width-wise direction of the seat cushion 11 in the seatback 12 at positions located at the vertically lower end of the seatback 12.

Two fourth bladders 24 are arranged beside each other in the width-wise direction of the seat cushion 11 at positions located toward the upper side (toward the headrest 13) from the third bladders 23.

Two fifth bladders 25 are arranged beside each other in the width-wise direction of the seatback 12 at positions located toward the upper side (toward the headrest 13) from the fourth bladders 24.

More specifically, the third to fifth bladders 23, 24, 25 are accommodated in the seatback 12 so that the third bladders 23, the fourth bladders 24, and the fifth bladders 25 are vertically arranged in order from a lower side.

Two lumbar bladders 26 are accommodated in the seatback 12 and arranged beside each other in the sideward direction (width-wise direction) at positions located toward the lower end of the seatback 12. The lumbar bladders 26 mainly support the lumbar of the seated vehicle occupant. The lumbar bladders 26 are located between the third bladders 23 and the fourth bladders 24, which are accommodated in the seatback 12.

The bladders 21 to 26 are each inflated and deflated by fluid (air) that is supplied and discharged when the electric pump 30 is driven, which will be described later.

Figure 2:
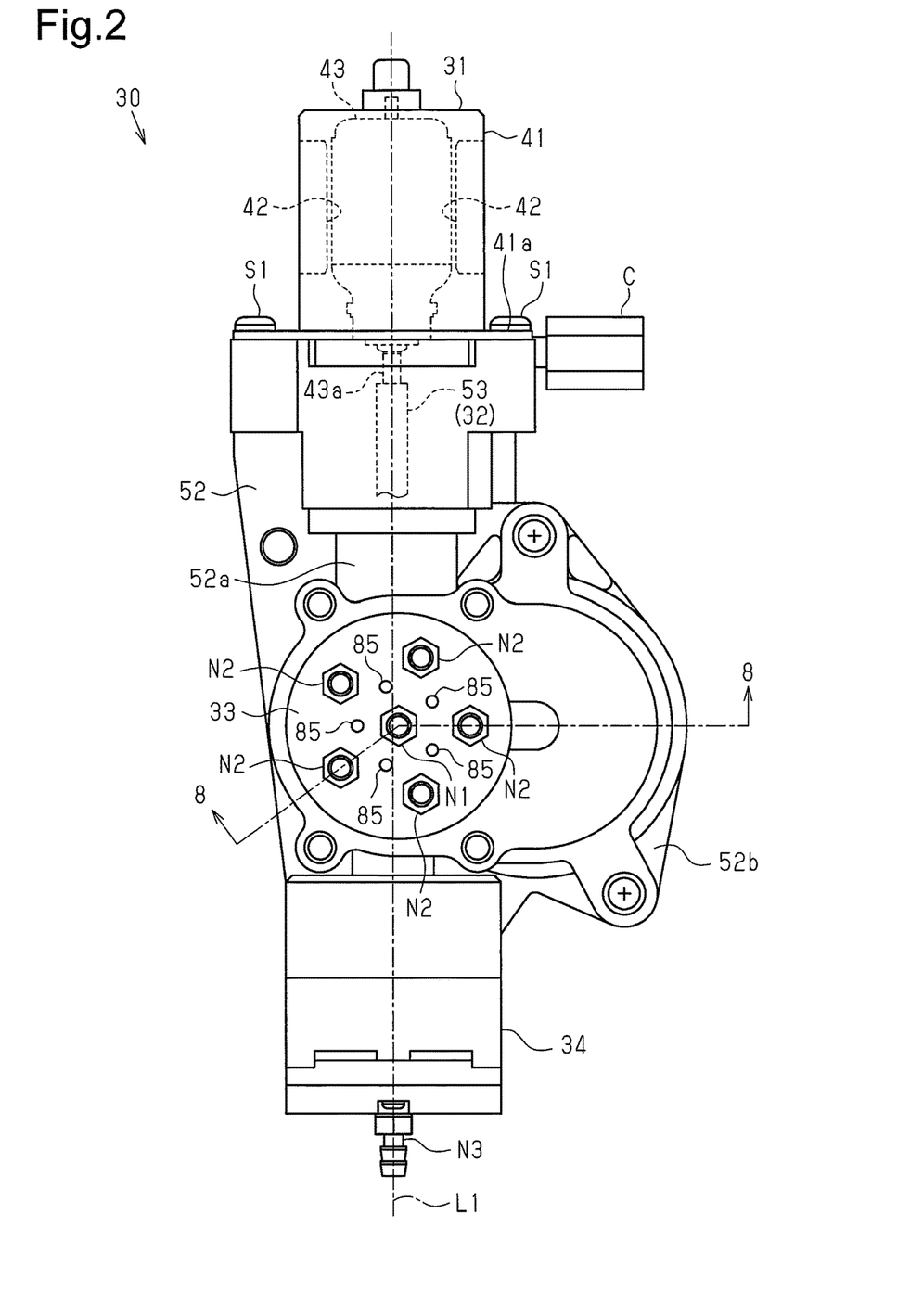
FIG. 2 is a front view of the electric pump shown in FIG. 1.
Figure 3:
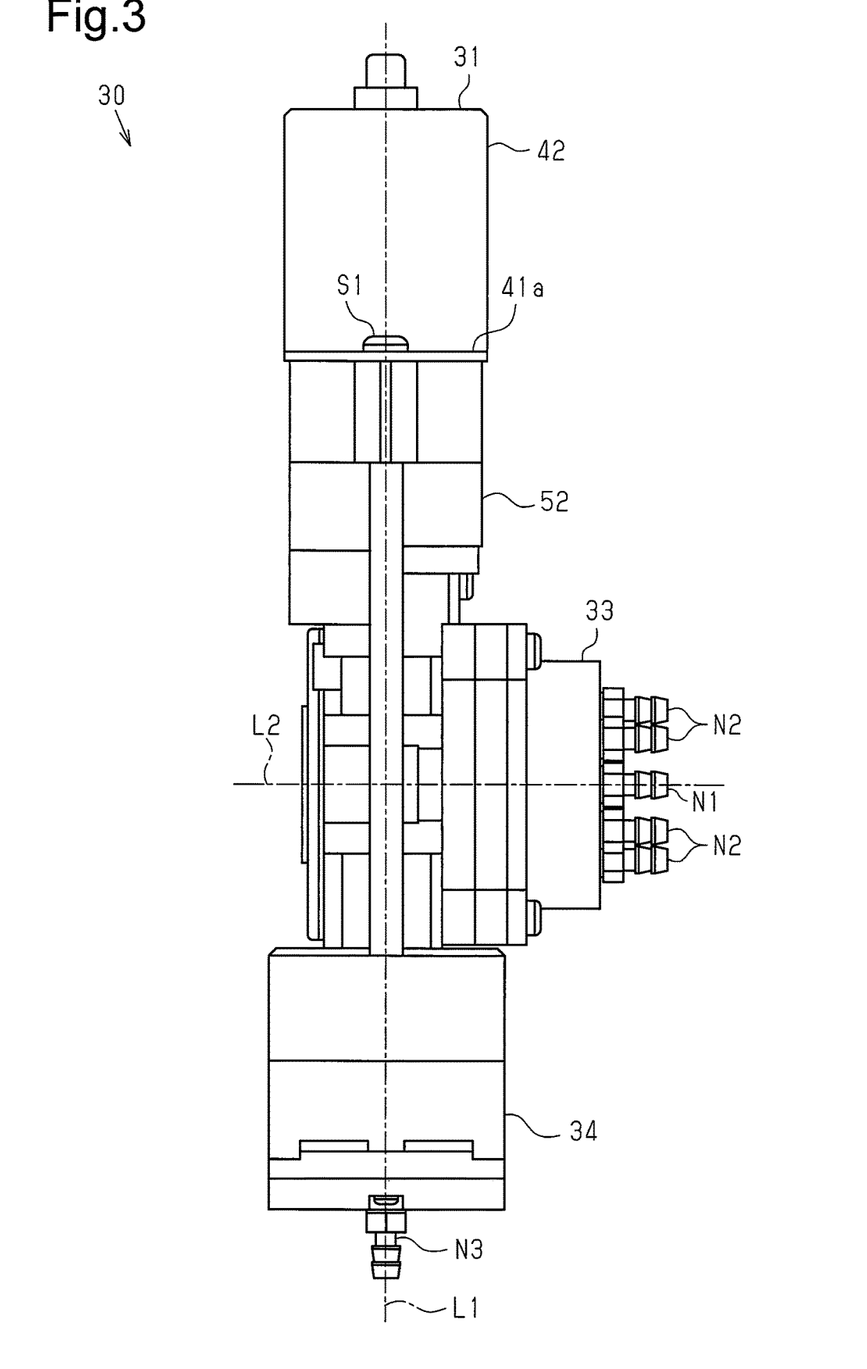
FIG. 3 is a side view of the electric pump shown in FIG. 2.

As shown in FIGS. 2 and 3, the electric pump 30 includes a motor unit 31, a speed reduction unit 32 functioning as a transmission unit, a rotary valve unit 33 (hereafter, simply referred to as the valve unit 33), and a pump unit 34.

As shown in FIG. 2, the motor unit 31 includes a tubular yoke housing 41 having a closed end, magnets 42 fixed to the inner circumference of the yoke housing 41, and a rotor 43 rotationally supported in the yoke housing 41. The rotor 43 includes a rotation shaft 43a in the center. The rotation shaft 43a includes a distal end (upper end in FIG. 2), which is rotationally supported by a bearing (not shown) coupled to a central portion of the closed end of the yoke housing 41. The rotor 43 also includes a commutator (not shown) configured to contact and slide along brushes (not shown). Power is supplied from the exterior to the brushes through a connector C. The power is supplied to the commutator from the brushes. A flange 41a radially extends from the open end of the yoke housing 41. The flange 41a is fastened to a gear housing 51, which will be described later, by screws S1.

Figure 4:
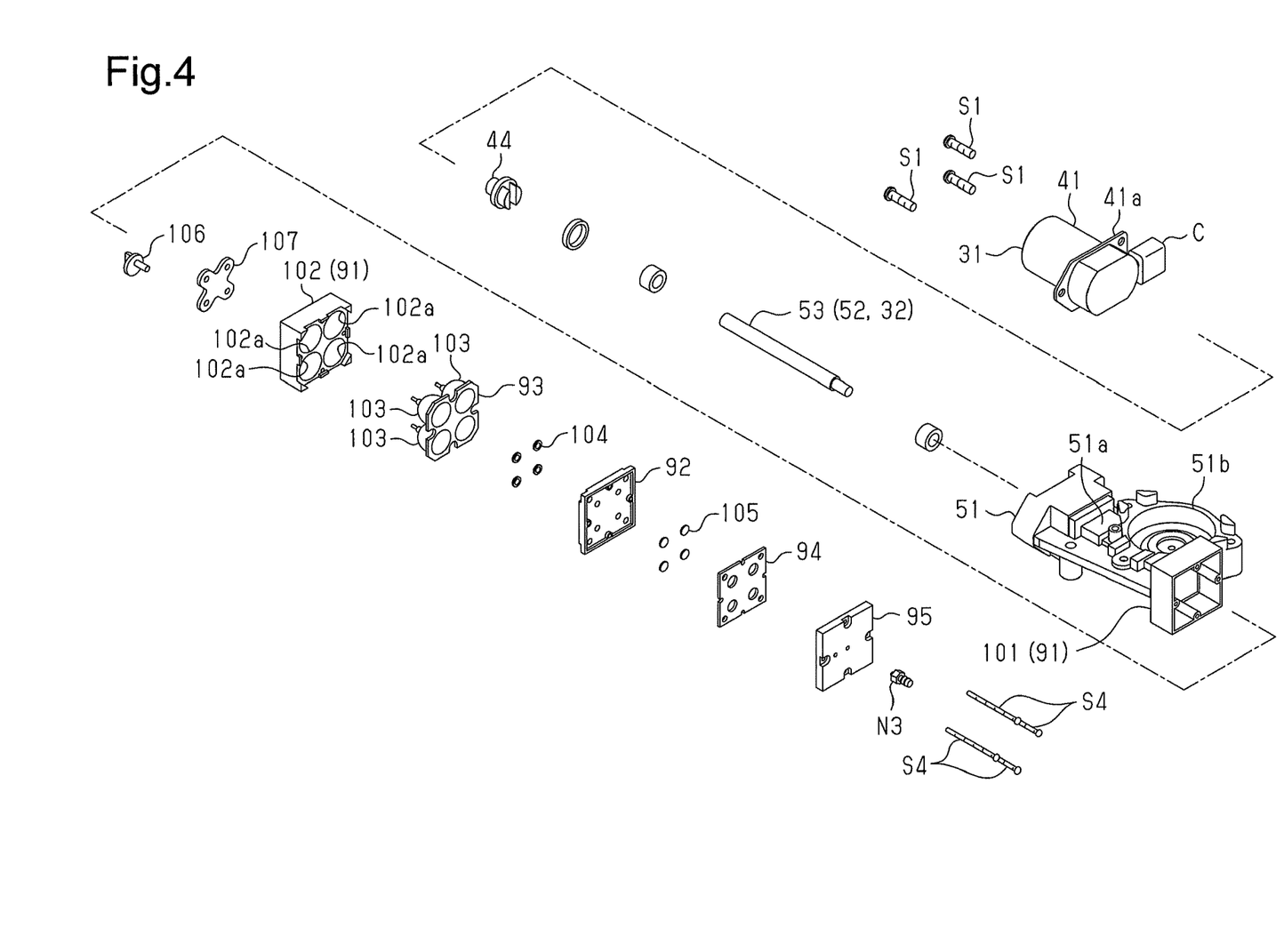
FIG. 4 is an exploded perspective view showing a motor unit and a pump unit of the electric pump shown in FIG. 2.

As shown in FIGS. 2 to 4, the rotation shaft 43a is drive-coupled to a worm shaft 53, which forms the speed reduction unit 32, by a joint member 44 (refer to FIG. 4). In FIG. 2, the joint member is not indicated by broken lines.

Figure 5:
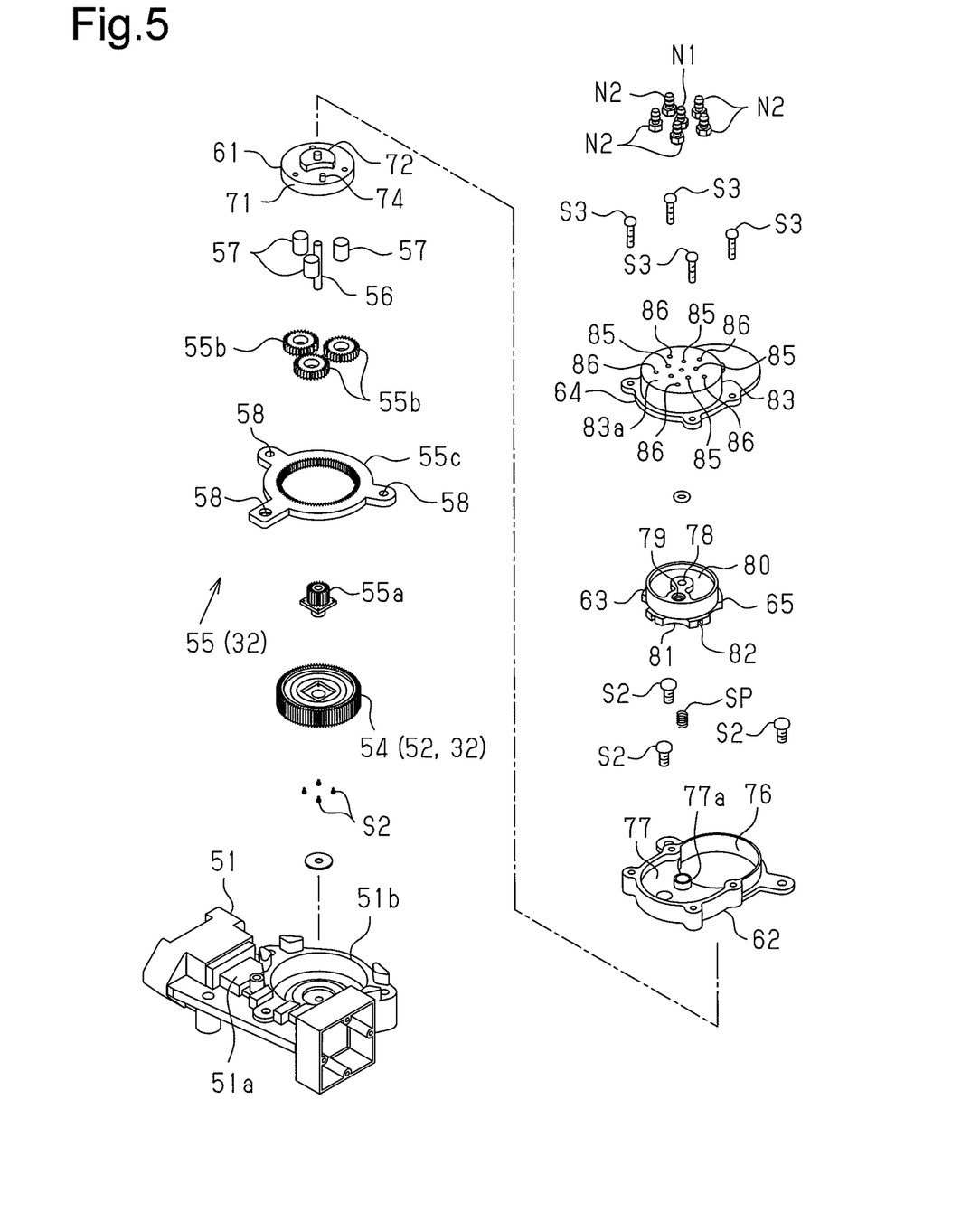
FIG. 5 is an exploded perspective view showing a portion of the motor unit and a valve unit of the electric pump shown in FIG. 2.

As shown in FIGS. 2, 4, and 5, the speed reduction unit 32 includes the gear housing 51, a worm gear 52, and a planetary gear mechanism 55. The worm gear 52 includes the worm shaft 53, which is drive-coupled so that the worm shaft 53 is rotated integrally with the rotation shaft 43a extending from the motor unit 31 about the same axis L1, and a worm wheel 54, which is meshed with the worm shaft 53.

The gear housing 51 includes a worm receptacle 51a, which is coupled and fixed to the yoke housing 41 and receives the worm shaft 53, and a gear receptacle 51b, which is in communication with the worm receptacle 51a and located in a direction (in FIG. 2, right direction) orthogonal to the axis of the worm receptacle 51a from an intermediate portion of the worm receptacle 51a.

The worm wheel 54 is generally disk-shaped and includes outer circumferential teeth meshed with teeth of the worm shaft 53. The planetary gear mechanism 55 includes a sun gear 55a, which is fastened to the worm wheel 54 by screws S2. A center support shaft 56 is inserted through a central part of the sun gear 55a. The center support shaft 56 is fixed to the gear receptacle 51b of the gear housing 51.

The planetary gear mechanism 55 includes the sun gear 55a, planetary gears 55b, and an inner gear 55c.

Each planetary gear 55b includes a tubular outer circumference on which teeth are arranged. The planetary gear 55b includes an inner circumference, which is fitted on a planetary support shaft 57 so that the planetary gear 55b is rotationally supported. The teeth arranged on the outer circumference are meshed with the sun gear 55a and the inner gear 55c.

The inner gear 55c includes an annular inner circumference on which teeth are arranged and an outer circumference provided with insertion holes 58. The screws S2 are inserted through the insertion holes 58 to fasten to the gear housing 51.

Each planetary support shaft 57 is connected to a drive wheel 61 that forms the valve unit 33, which will be described later. More specifically, the planetary support shafts 57 are respectively inserted into three engagement holes 73a of the drive wheel 61, which will be described later. When the planetary support shafts 57 (planetary gears 55b) revolve around the sun gear 55a, the drive wheel 61 is rotated. At this time, each planetary gear 55b rotates about the corresponding planetary support shaft 57.

The valve unit 33 is a rotary valve and includes the drive wheel 61, a valve base 62, a valve body 63, and a valve cover 64.

Figure 6:
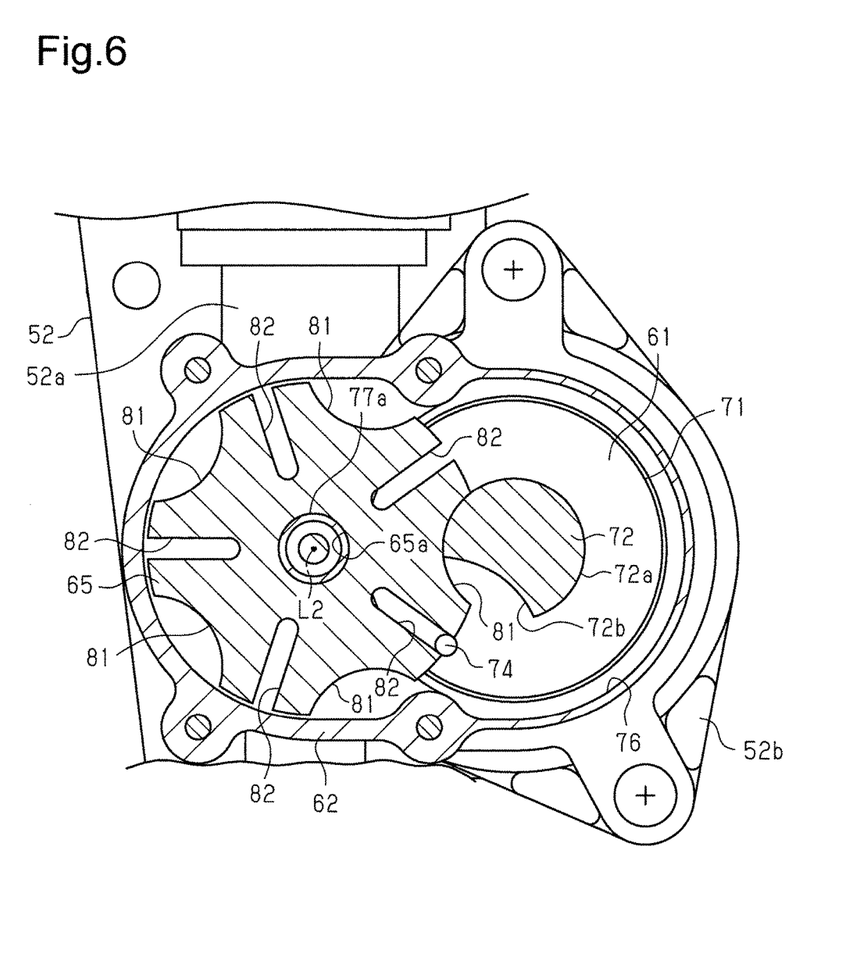
FIG. 6 is a cross-sectional view of the electric pump shown in FIG. 2 taken along line 6-6 in FIG. 8.

As shown in FIGS. 5 and 6, the drive wheel 61 includes a generally disk-shaped body 71 and a cam portion 72 formed integrally with the body 71 on a first surface of the body 71. The body 71 of the drive wheel 61 includes a surface defining a second surface that is opposite to the surface on which the cam portion 72 is formed. The second surface is provided with the three engagement holes 73a into which the planetary support shafts 57 are inserted. Also, a central part of the drive wheel 61 is provided with a center hole 73b into which the center support shaft 56 may be inserted. The cam portion 72 of the drive wheel 61 includes a convex circumferential surface 72a and a concave circumferential surface 72b. The convex circumferential surface 72a is crescent-shaped as viewed in an extension direction (axial direction) of the center support shaft 56, which is a rotation center of the drive wheel 61. Also, the convex circumferential surface 72a has the form of an arc centered about each planetary support shaft 57. The concave circumferential surface 72b is arc-shaped and concaved toward the center support shaft 56. A projection 74 projects from the first surface of the drive wheel 61. More specifically, the projection 74 is opposed to the concave circumferential surface 72b.

The valve base 62 is provided with a through hole 76, into which the drive wheel 61 is inserted, and includes a base portion 77, on which the valve body 63 may be mounted. The valve base 62 is fastened to the gear housing 51 by the screws S2 together with the inner gear 55c.

The valve body 63 is generally disk-shaped and includes a surface opposed to the valve cover 64 and provided with a vent 78, which functions as a body-side inlet, and a vent 79, functions as a body-side outlet.

Figure 8:
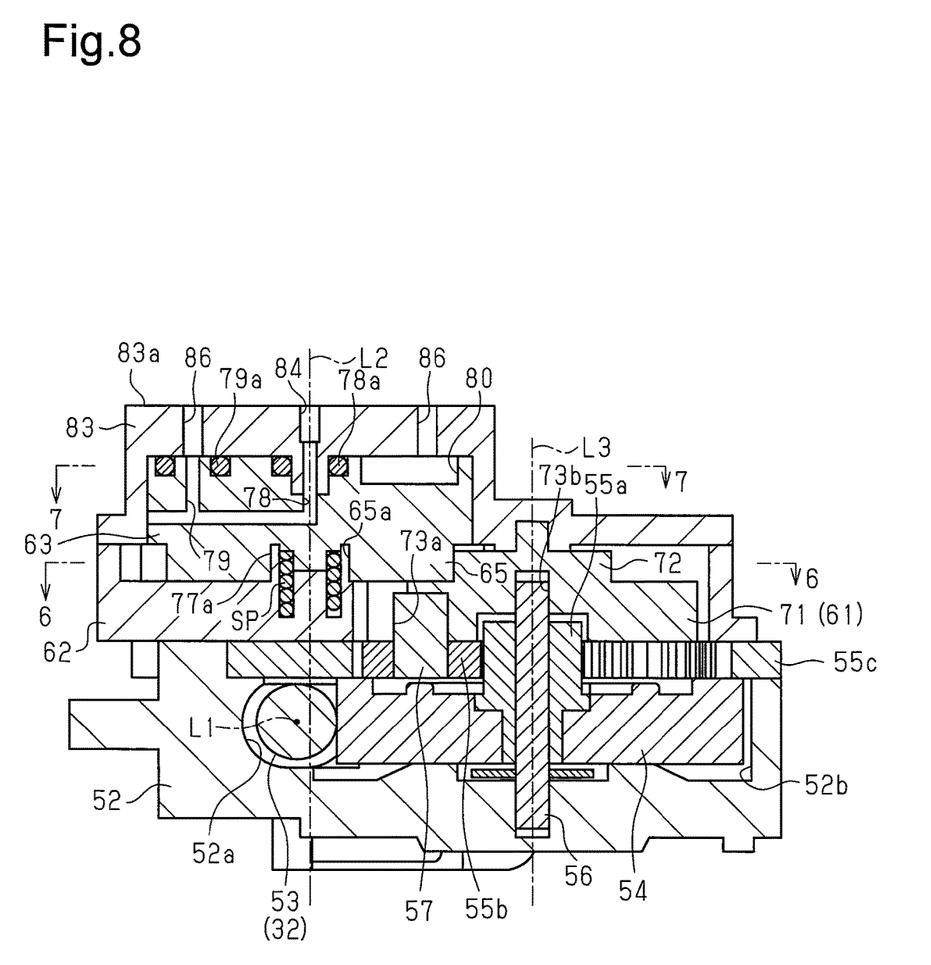
FIG. 8 is a cross-sectional view taken along line 8-8 in FIG. 2.

As shown in FIG. 8, the vents 78, 79 are in communication with each other inside the valve body 63. The vents 78, 79 include a center vent 78, which opens in the center of the valve body 63, and an outer vent 79, which opens at an outer side of the center vent 78.

Figure 7:
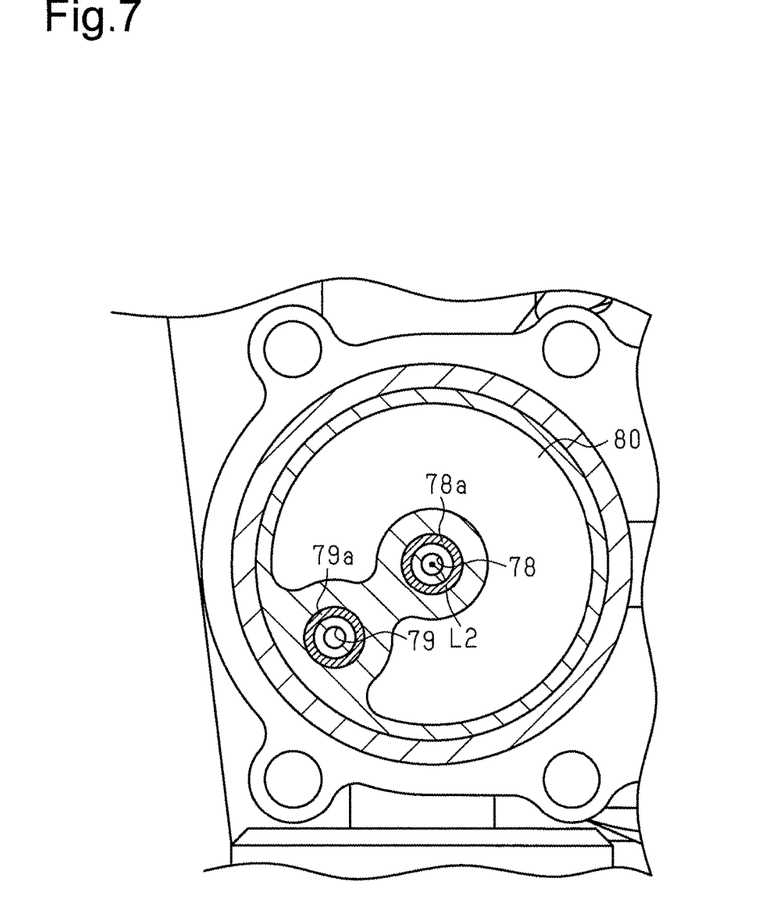
FIG. 7 is a cross-sectional view of the electric pump shown in FIG. 2 taken along line 7-7 in FIG. 8.

As shown in FIG. 7, a recess 80 is formed in the valve body 63 around the center vent 78 excluding the outer vent 79. The recess 80 is formed in a direction the vents 78, 79 open. The recess 80 is generally arc-shaped as viewed in the open direction of the vents 78, 79 so that the recess 80 is formed in a range around the center vent 78 excluding the outer vent 79.

As shown in FIGS. 5 and 6, the valve body 63 is formed integrally with a driven wheel 65, which engages with the drive wheel 61.

The drive wheel 61, which has been described, and the driven wheel 65 form a so-called Geneva drive. The drive wheel 61 is continuously driven. The driven wheel 65 is intermittently driven.

As shown in FIG. 6, the driven wheel 65 includes arc-shaped recesses 81 having the same form and U-shaped cutaway grooves 82 having the same form that open radially outward. The recesses 81 and the grooves 82 are alternately arranged in the rotation direction (circumferential direction) on five locations at a predetermined pitch. The driven wheel 65 includes a center portion provided with an engagement hole 65a. The driven wheel 65 is supported when a tube 77a included in the base portion 77 is inserted into the engagement hole 65a. A spring SP is inserted in the tube 77a. The spring SP urges the driven wheel 65 in a direction extending away from the base portion 77 (extending toward the valve cover 64).

The grooves 82 sequentially engage with the projection 74 that rotates in accordance with the rotation of the drive wheel 61. More specifically, when the drive wheel 61 rotates, the projection 74 enters and engages with each groove 82. Then, the drive wheel 61 rotates as the engaged state is maintained. Thus, the driven wheel 65 (valve body 63) rotates while the projection 74 and the groove 82 engage with each other.

At this time, the concave circumferential surface 72b of the cam portion 72 passes a location close to the driven wheel 65. This avoids contact between the cam portion 72 of the drive wheel 61 and the driven wheel 65. When the engaged state of the projection 74 and the groove 82 is canceled (the projection 74 is separated from the groove 82), the driven wheel 65 stops. At this time, the drive wheel 61 continues the rotational drive. Thus, the convex circumferential surface 72a relatively moves along the arc-shaped surface of the recess 81. In this manner, the drive wheel 61 and the driven wheel 65 switch the continuous drive to the intermittent drive.

As shown in FIG. 8, the valve body 63, which is rotated by the rotational drive of the drive wheel 61, is arranged so that a rotation axis L2 of the valve body 63 is orthogonal to the worm shaft 53. More specifically, the valve body 63 is arranged so that the rotation axis L2 extends on the worm shaft 53, which functions as a transmission shaft that is rotated together with the rotation shaft 43a of the motor unit 31 about the same axis L1, at a position deviated from the axis L1 (position toward the drive wheel 61). In this case, the axes L1, L2 are orthogonal to each other as viewed in a direction in which the axis L1 and the axis L2 extend orthogonal to each other.

Additionally, the valve body 63 is arranged so that the rotation axis L2 is parallel to an axis L3 that extends through the rotation center of the drive wheel 61.

As shown in FIG. 5, the valve cover 64 is coupled to the valve base 62 by screws S3. Thus, when the valve base 62 is coupled to the gear housing 51 and then the valve cover 64 is coupled to the valve base 62, the drive wheel 61 and the valve body 63 are accommodated inside the valve cover 64 and the valve base 62.

The valve cover 64 includes a valve body receptacle 83, which receives the valve body 63. The valve body receptacle 83 is tubular and has a closed end defining a closed portion 83a. The closed portion 83a is provided with holes 84, 85, 86. The holes 84, 85, 86 include a center coupling hole 84, which is formed in the center of the circular closed portion 83a and capable of coupling a nozzle N1, five gas discharge holes 85, which are located at an outer side of the center coupling hole 84 and used to discharge gases, and outer coupling holes 86, which are located at an outer side of the gas discharge holes 85 and capable of coupling nozzles N2.

As shown in FIG. 5, the nozzle N1 is coupled to the center coupling hole 84. The nozzle N1, which is coupled to the center coupling hole 84, is connected to a hose (not shown) connected to the pump unit 34.

As shown in FIG. 8, when coupled, the center coupling hole 84 is opposed to and communicated with the vent 78 of the valve body 63.

As shown in FIGS. 7 and 8, an O-ring 78a, which functions as a seal member, is arranged so that a gap is not formed between the center coupling hole 84 and the vent 78.

A nozzle N2 is coupled to each outer coupling hole 86. The nozzles N2, which are coupled to the outer coupling holes 86, are respectively connected to hoses (not shown) connected to the refreshing bladders 21 to 25.

As shown in FIG. 8, when the driven wheel 65 is still, one of the outer coupling holes 86 is, for example, opposed to and communicated with the outer vent 79 of the valve body 63. This communicates the center coupling hole 84, the center vent 78, the outer vent 79, and the outer coupling hole 86 to each other.

As shown in FIGS. 7 and 8, an O-ring 79a is arranged so that a gap is not formed between the outer coupling hole 86 and the vent 79 when opposed to each other.

When, for example, one of the outer coupling holes 86 is opposed to the outer vent 79 while the driven wheel 65 is still, the gas discharge holes 85 are opposed to the recess 80. Thus, the gas discharge holes 85 are in communication with each other. Additionally, the outer coupling holes 86 that are not opposed to the outer vent 79 are opposed to the recess 80. Thus, the outer coupling holes 86 that are not opposed to the outer vent 79, the recess 80, and the gas discharge holes 85 are in communication with each other.

Figure 9:
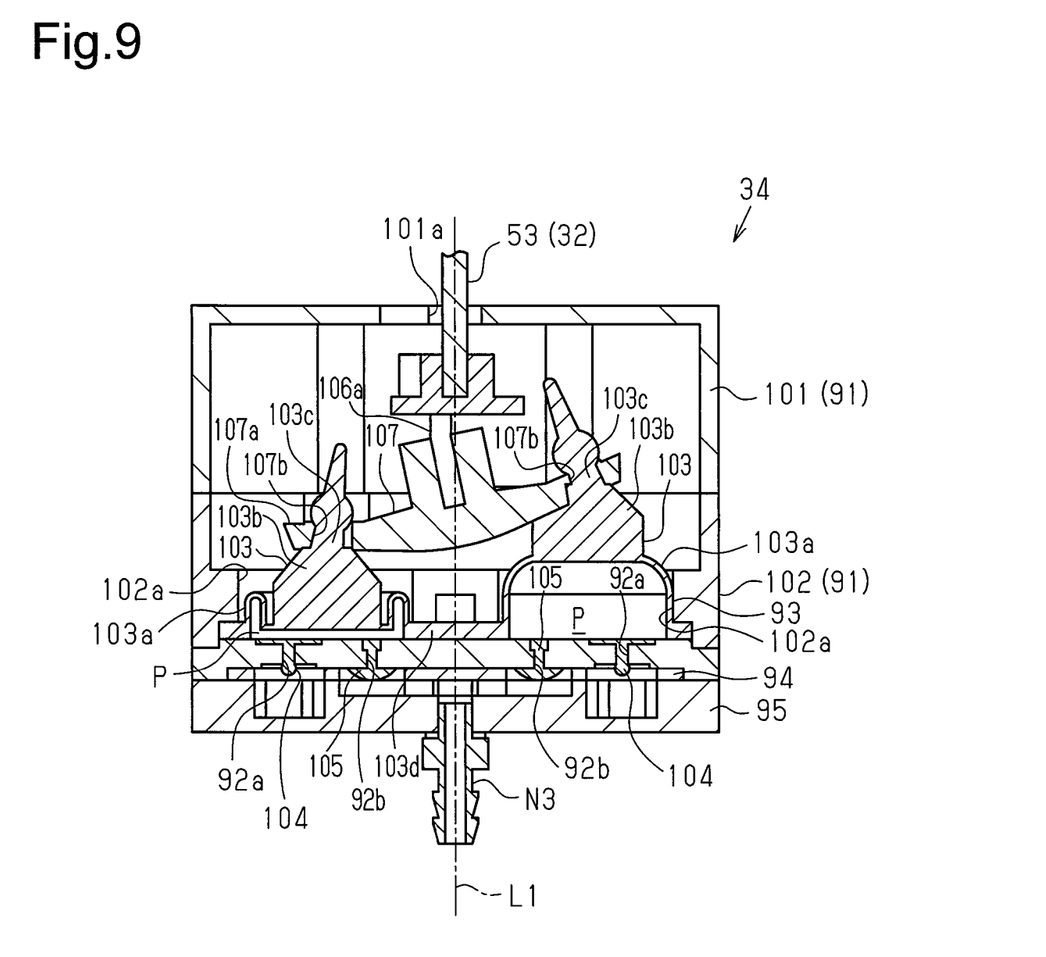
FIG. 9 is a cross-sectional view of the electric pump shown in FIG. 2.

As shown in FIG. 9, the pump unit 34 includes a pump housing 91, a cover 92, a diaphragm member 93, a seal member 94, a nozzle coupling plate 95, and a nozzle N3.

The pump housing 91 includes a tetragonal tubular body 101, which has a closed end and is formed integrally with the gear housing 51, and a tetragonal tube 102, which is coupled to the body 101 and holds the diaphragm member 93.

The closed end (in FIG. 9, upper portion) of the body 101 includes an axial center through which a shaft insertion hole 101a extends.

The tube 102 is provided with four through holes 102a circumferentially arranged at an interval of equal angles (90°). FIG. 9 shows only two through holes 102a.

The diaphragm member 93 includes four diaphragms 103 circumferentially arranged beside one another at positions corresponding to the four through holes 102a.

Each diaphragm 103 includes a cup-shaped pump chamber defining portion 103a, which defines a pump chamber P, a solid operation portion 103b, which projects from a bottom of the pump chamber defining portion 103a and has a trapezoidal cross-section, and a held portion 103c, which projects from a bottom of the operation portion 103b.

As shown in FIG. 9, a coupling plate 103d is coupled to the open ends of the pump chamber defining portions 103a so that the four diaphragms 103 form one diaphragm member 93. The diaphragms 103 are inserted into the through holes 102a and located in the tubes 102, and the coupling plate 103d is held between the tube 102 and the cover 92. This holds the diaphragm member 93.

The cover 92 is provided with inlets 92a and outlets 92b at positions corresponding to each pump chamber defining portion 103a (pump chamber P). In the cover 92, umbrella valves 104 are located in the inlets 92a, and umbrella valves 105 are located in the outlets 92b. The umbrella valves 104 open when the pump chambers P have negative pressure relative to the exterior and close when the pump chambers P have positive pressure. The umbrella valves 105 close when the pump chambers P have negative pressure relative to the exterior and open when the pump chambers P have positive pressure.

The seal member 94 is provided with holes in positions corresponding to the inlets 92a so as to communicate the inlets 92a. The seal member 94 is provided with holes in positions corresponding to the outlets 92b so as to communicate the outlets 92b.

The nozzle coupling plate 95 has the form of a tetragonal plate and is coupled to the body 101 by screws S4 with the tube 102, the diaphragm member 93, the cover 92, and the seal member 94 located in between.

The worm shaft 53 includes an end to which a coupling member 106 is fixed. An inclined shaft 106a, which is fixed to a portion of the coupling member 106 that is deviated from the axis L1, is inclined toward the axis L1. The inclined shaft 106a is attached to an actuation member 107, which includes a plurality (in the present embodiment, four) of actuation portions 107a arranged in the circumferential direction. When the worm shaft 53 rotates, the actuation portions 107a sequentially reciprocate in a direction inclined relative to the worm shaft 53. Each actuation portion 107a is provided with a holding hole 107b. The held portions 103c of the diaphragms 103 are fitted into and held by the holding holes 107b.

As shown in FIG. 1, the present embodiment includes a switch valve B1 that allows a flow channel of the fluid supplied from the pump unit 34 to be selected between when the fluid is supplied to the refreshing bladders 21 to 25 and when the fluid is supplied to the lumbar bladders 26. At the downstream side of the switch valve B1, a valve B2 is located in a flow channel connected to the lumbar bladders 26. The valve B2 allows for switching between supply to the lumbar bladders 26 and discharge of the fluid out of the lumbar bladders 26.

As shown in FIG. 1, at the downstream side of the switch valve B1, an exhaust valve B3 is located in a flow channel connected to the refreshing bladders 21 to 25. More specifically, the exhaust valve B3 is located at the upstream side of the valve unit 33 of the electric pump 30. The exhaust valve B3 is configured so that, for example, when the fluid (e.g., air) is supplied from the pump unit 34, the pressure opens the flow channel between the pump unit 34 and the valve unit 33 to supply the fluid, and when the pump unit 34 (electric pump 30) is deactivated, the flow channel is closed between the pump unit 34 and the valve unit 33. When the flow channel is closed between the pump unit 34 and the valve unit 33, a flow channel that allows for discharge from the valve unit 33 opens.

The operation of the electric pump 30 having the above structure will now be described.

When the motor unit 31 is driven to rotate the rotation shaft 43a, the worm shaft 53 rotates. This rotates the inclined shaft 106a of the pump unit 34 in an inclined state. Consequently, the actuation portions 107a of the actuation member 107 sequentially reciprocate in a direction inclined relative to the worm shaft 53. Accordingly, the pump chambers P, which are defined by the diaphragms 103 coupled to the actuation portions 107a, sequentially expand and contract to draw in the fluid (in the present embodiment, air) from the inlet 92a and discharge the fluid from the nozzle N3.

The rotation of the worm shaft 53 rotates the worm wheel 54, which is meshed with the worm shaft 53. This rotates the sun gear 55a of the planetary gear mechanism 55 and revolves the planetary gears 55b around the sun gear 55a as the planetary gears 55b rotate. The revolution of the planetary gears 55b rotates the drive wheel 61, into which the planetary support shafts 57 of the planetary gears 55b are inserted. When the drive wheel 61 rotates, the projection 74 of the drive wheel 61 cyclically engages with the grooves 82 of the driven wheel 65. This intermittently drives the driven wheel 65. When the driven wheel 65 is still while the drive wheel 61 is rotating, the outer vent 79 of the valve body 63, which is formed integrally with the driven wheel 65, is opposed to one of the outer coupling holes 86 of the valve cover 64.

For example, when the switch valve B1 selects the flow channel to the refreshing bladders 21 to 25, the fluid discharged from the pump unit 34 flows through the hose, the switch valve B1, and the exhaust valve B3 and into the valve unit 33 from the center coupling hole 84 (nozzle N1) of the valve unit 33. Then, the fluid is supplied to the refreshing bladders 21 to 25 through the center coupling hole 84, the center vent 78, the outer vent 79, and the outer coupling hole 86 opposed to the outer vent 79. At this time, as described above, the outer coupling holes 86 that are not opposed to the outer vent 79 are opposed to the recess 80. Thus, the fluid may be discharged out of the refreshing bladders 21 to 25 connected to the outer coupling holes 86 (nozzles N2) that are not opposed to the outer vent 79.

The present embodiment has the advantages described below.

(1) The valve body 63 is intermittently driven by the drive wheel 61 and the driven wheel 65 that form a Geneva drive, which functions as an intermittent drive mechanism that converts continuous drive corresponding to rotational drive force into intermittent drive. More specifically, the valve body 63 is not continuously but intermittently (discontinuously) driven. This earns time for the outer vent 79 and one of the outer coupling holes 86 to be opposed to each other. When the valve body 63 is still, the outer vent 79 functions to communicate the center coupling hole 84, which is arranged in the valve body 63 and functions as a valve-side inlet, and the outer coupling hole 86, which functions as a fluid outlet. This limits enlargement of the valve body 63 and eliminates the need to add a speed reduction unit for further reducing the speed. Thus, increases in the entire size of the device are limited.

(2) The rotary valve unit 33 is arranged so that the axis L2, which extends through the rotation center of the valve body 63, is orthogonal to the worm shaft 53, which rotates coaxially and integrally with the rotation shaft 43a of the motor unit 31. More specifically, the valve body 63 may be located so that the rotation center of the valve body 63 of the rotary valve unit 33 overlaps the worm shaft 53 as viewed in a direction the axis L2, which is the rotation center, extends. This limits enlargement in a direction deviated from the worm shaft 53 as compared to when the axis L2, which extends through the rotation center of the valve body 63, does not extend on the worm shaft 53. Further, if the axis L2, which extends through the rotation center of the valve body 63, does not orthogonally intersect with the worm shaft 53 even when extending on the worm shaft 53, the valve body 63 would be inclined. This results in a structure in which the valve body 63 projects in a direction orthogonal to the worm shaft 53 (direction in which the axis L2 extends). Such projection of the valve body 63 may be limited when the valve body 63 is located so that the axis L2, which extends through the rotation center of the valve body 63, is orthogonal to the worm shaft 53 as described above. This limits enlargement in the direction orthogonal to the worm shaft 53 (direction in which the axis L2 extends).

(3) The valve body 63 is located so that the rotation axis L2 extends between the axis L1 and the center axis L3 of the drive wheel 61. More specifically, the valve body 63 is located close to the drive wheel 61. This limits a projection amount of the valve body 63 from the axis L1 toward a side opposite to the drive wheel 61.

(4) The intermittent drive mechanism may be formed by a Geneva drive.

(5) The valve body 63, which forms the rotary valve unit 33, is formed integrally with the driven wheel 65. This eliminates the need to separately drive-couple the driven wheel 65 to the valve body 63.

(6) The axis L3, which extends through the rotation center of the drive wheel 61, is parallel to the rotation axis L2 of the valve body 63. This limits a projection amount of the valve body 63 from the drive wheel 61 in a direction the axis L2 of the drive wheel 61 extends as compared to when the drive wheel 61 is drive-coupled to the valve body 63, for example, in a manner in which the axes L2, L3 intersect with (extend orthogonal to) each other.

(7) In the valve body 63, the center vent 78, which draws in the fluid from the pump unit 34, and the outer vent 79 are each circular. Thus, general O-rings 78a, 79a may be used to seal the valve body 63.

(7) When the center vent 78 and the outer vent 79 have the same diameter, the same O-rings 78a, 79a may be used.

The above embodiment may be modified as follows.

In the above embodiment, the center vent 78 and the outer vent 79 have the same diameter. Instead, the center vent 78 and the outer vent 79 may have different diameters.

In the above embodiment, the outer vent 79 is circular. Instead, the outer vent 79 may be arc-shaped.

In the above embodiment, the valve body 63 and the driven wheel 65 are formed integrally with each other. Instead, the valve body 63 and the driven wheel 65 may be separate bodies.

In the above embodiment, the worm shaft 53 and the worm wheel 54 are configured as a portion of the speed reduction unit 32. Instead, for example, a multistage planetary gear mechanism 55 may be used to reduce the rotational drive force of the motor unit 31 (rotation shaft 43a).

In the above embodiment, the valve body 63 is arranged so that the axis L2 orthogonally intersects with the worm shaft 53 at a position slightly deviated from the axis L1. Instead, the valve body 63 may be arranged relative to the worm shaft 53 so that the axis L2 orthogonally intersects with the axis L1.

In the above embodiment, the rotation axis L2 of the valve body 63 is configured to be parallel to the axis L3 of the drive wheel 61. Instead, the valve body 63 may be located so that the rotation axis L2 of the valve body 63 is orthogonal to the axis L3 of the drive wheel 61 as long as drive force is transmittable. In this case, for example, two helical gears may be used to orthogonally convert the drive force. This allows for transmission of the drive force between the valve body 63 and the drive wheel 61 (driven wheel 65).

In the above embodiment, the bladders include the refreshing bladders 21 to 25 and the lumbar bladders 26. Instead, for example, the lumbar bladders 26 may be omitted from the configuration. Also, the number of the lumbar bladders 26 may be changed.

In the above embodiment, there are ten (five sets of) refreshing bladders 21 to 25. However, the number of bladders is not limited as long as a plurality of bladders individually expands and contracts when the valve unit 33 shifts. For example, the number of bladders may be changed as long as there are two or more bladders.

In the above embodiment, the Geneva drive formed by the drive wheel 61 and the driven wheel 65 is configured as an intermittent drive unit. Instead, a different intermittent drive mechanism such as a parallel index cam mechanism may be used.

The above embodiment and modified examples may be combined.

The invention claimed is:

1. An electric pump comprising:
a motor unit that is rotated and driven;
a transmission unit that transmits rotational drive of the motor unit;
a pump unit that uses rotational drive force transmitted by the transmission unit to expand and contract a pump chamber and draw in a fluid from an inlet and discharge the fluid from an outlet; and
a rotary valve unit that includes a valve body and a valve cover, wherein the valve body is rotated by the rotational drive force transmitted by the transmission unit, the valve cover includes a valve-side inlet that draws in the fluid supplied from the pump unit and a plurality of fluid outlets that discharges the fluid to an exterior, and the rotary valve unit is configured to switch the fluid outlets that come into communication with the inlet in accordance with rotational drive of the valve body,
wherein the valve body is intermittently driven by an intermittent drive mechanism that converts continuous drive corresponding to the rotational drive force into intermittent drive.

2. The electric pump according to claim 1, wherein
the transmission unit includes a transmission shaft that rotates coaxially and integrally with a rotation shaft of the motor unit, and
the rotary valve unit is arranged so that an axis extending through a rotation center of the valve body is orthogonal to the transmission shaft.

3. The electric pump according to claim 1, wherein the intermittent drive mechanism is a Geneva drive.

4. The electric pump according to claim 3, wherein
the Geneva drive includes a drive wheel that performs continuous driving and a driven wheel that engages with the drive wheel and performs intermittent driving, and
the valve body, which forms the rotary valve unit, and the driven wheel are formed integrally with each other.

5. The electric pump according to claim 4, wherein an axis extending through a rotation center of the drive wheel is parallel to an axis extending through a rotation center of the valve body.

6. The electric pump according to claim 1, wherein
the valve body includes a body-side inlet opposed to the valve-side inlet and a body-side outlet opposed to each of the fluid outlets, and
the body-side inlet and the body-side outlet are each circular.

7. The electric pump according to claim 6, wherein the body-side inlet and the body-side outlet have the same diameter.

* * * * *